March 7, 1939.    W. H. SCOTT    2,149,794
SIGNALING DEVICE
Filed Oct. 31, 1936
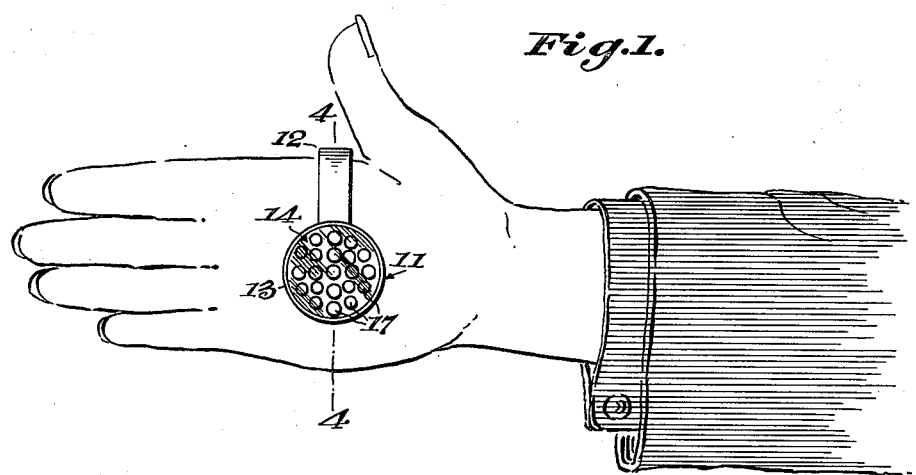
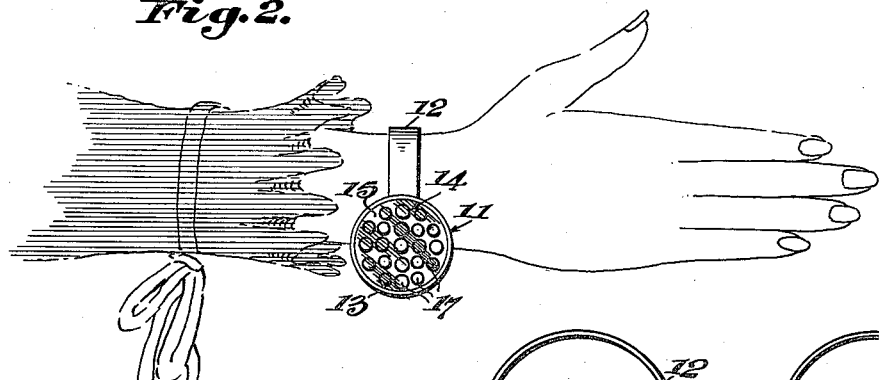
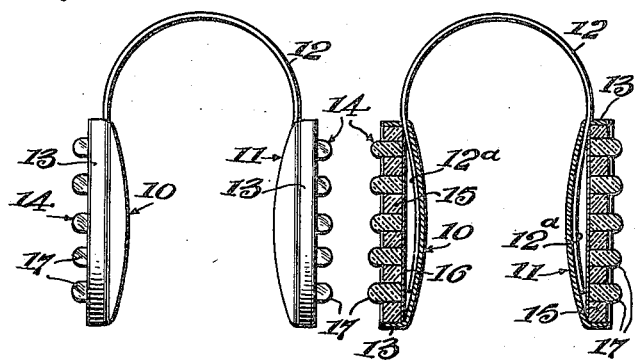
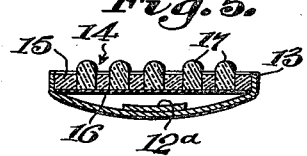
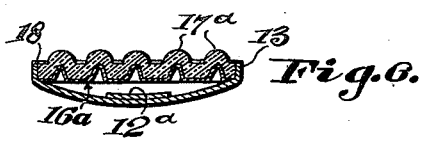
Inventor
William H. Scott,
By
Attorney Patented Mar. 7, 1939

2,149,794

UNITED STATES PATENT OFFICE 2,149,794

SIGNALING DEVICE

William H. Scott, Rochester, N. Y.

Application October 31, 1936, Serial No. 108,649

1 Claim. (Cl. 88—80)

The present invention relates generally to signaling devices and more particularly to such devices as are employed in connection with the driving and manipulation of automobiles and other vehicles in giving notice in accordance with the safety laws of the intention of the driver to either stop or make a turn in traffic, and has for one of its important objects the provision of a signaling device not only adapted for efficient use by the driver of a vehicle, but also by pedestrians generally in crossing streets or roadways, more especially those crossings or other roadway points which are without lights or are insufficiently lighted.

It is well known that most safety laws for automobile traffic define certain outstanding positions of the driver's left arm in giving the required notice of an intention to stop or turn, and it is equally well known that while such a system operates with the expected efficiency during the day season, it loses a great portion of its efficiency at night. In many instances at night a following vehicle does not see the signal arm of the preceding driver, and in many instances, where it is plainly visible to the driver of the following vehicle, it is not effectively visible to a vehicle approaching from the opposite direction.

Motor cars are at present commonly provided with stop lights at the rear thereof, but these, at best, are merely signals to those following in the same direction, and in most instances have no turning indications. Moreover, they have the disadvantage of frequent failure due to short circuits, the burning out of light bulbs and other causes generally beyond the control of the driver of a vehicle unless his attention is specifically called to the failure.

Altogether, then, it is safe to say the arm signals of a driver are the most reliable and make for the greatest efficiency in the interests of safety, and it is an important object of my invention to extend thier sphere of usefulness into and throughout the night season and to render them effective in a measure substantially equal to daylight effectiveness in their warnings to traffic.

A further object is the provision of a signal means exposed by outward extension of the left arm, which will be effective at night without in any way hampering the operator in his control of the car beyond that necessitated by the arm movement, as well as one which may be conveniently carried for instantaneous use when required.

A further and important object of the invention is the provision of a neat, convenient device of a portable nature which may be readily slipped on a man's hand or a lady's wrist; which will readily adapt itself to varying thicknesses of hands or wrists, with or without gloves and/or coats; which will comfortably accommodate itself to the palm and back of the hand, and which may be easily and quickly placed in and removed from its effective position.

These and further objects of the invention will be better understood and more thoroughly appreciated from the following description in detail of the best modes so far devised for carrying the invention into practical effect, reference being had to the accompanying drawing, illustrating the same and forming a part of this specification, and wherein, Figures 1 and 2 are side elevations of the device showing its practical application to a hand and wrist, respectively.

Figure 3 is a side view of the device removed.

Figure 4 is a vertical transverse sectional view taken on line 4—4 of Figure 1.

Figure 5 is an enlarged detail sectional view through one of the signal members, and Figure 6 is a similar view illustrating a slight modification.

Referring now to these figures, my invention proposes the use of a readily portable signal device to be worn and displayed upon the hand, wrist or lower forearm and readily adapted to the varying thicknesses of male and female hands and wrists with and without gloves and/or coats, which may be easily and quickly placed in position and just as easily and quickly removed and which, for these reasons, preferably eliminates any actual connection with the arm or garments except that created by the mere placement of the device in one of the above positions most desirable or convenient to the individual user.

For these reasons, I propose a signal device, the two spaced apart, outwardly oppositely facing signal members 10 and 11 of which are preferably in the form of disks, connected by an inverted U-shaped band 12 formed of a suitable material which is flexible and elastic to the extent of adapting the same to clasp the hand, the wrist, or the lower forearm and to accommodate itself to the presence of gloves and coats of various thicknesses in a manner to present the signal disks or elements to the front and rear when the device is applied and the arm of the user is extended laterally in signaling position.

The signal disks or members 10 and 11 may be formed integral with the clasping band 12 and their circular form eliminates any angles likely to interfere with easy, quick placement of the device in, and its removal from, the effective position above mentioned. I preferably form each member with a central area of concavo-convex form, with its convex face toward the other member as to comfortably and conveniently seat in the palm of a hand. This form is plainly shown in Figures 3 and 4, and from the latter figure it will be seen that the ends 12a of the U-shaped band 12 are extended through slotted openings in the members 10 and 11 and bent to conform in shape to the concave surfaces of the latter to which they may be permanently and effectively connected by spot welding, soldering and the like.

I also preferably provide each signaling element with an outstanding surrounding flange or the like 13 adapting the same as seen in Figures 5 and 6 to the reception and retention of a circular signaling element 14, whose rear face may be silvered or otherwise treated to form a reflector, it being understood as regards this exemplification of the invention, as well as those to follow, that I may make the elements 10 and 11 or the flanges 13 thereof of other than circular form should it prove either desirable or expedient that the signaling or reflector elements have other than circular shape.

I may use within the flanges 13 of the elements 10 and 11 lens glasses 15 as in Figures 4 and 5, with reflectors at the rear thereof, in which event the outer surfaces of the disks 10 and 11 may support such reflectors as at 16, or I may use a coating forming a reflector surface, on the rear surfaces of the lens glasses 15 as at 16a in Figure 6. The lens glasses may include individual light reflecting and refracting buttons 17 of solid form as in Figures 4 and 5, or may be pressed to form integral hollow buttons 17a as in Figure 6.

I may also utilize the flanges 13 as merely surrounding walls to protect and define therein fields for the reception of the reflecting and refracting elements, though I also contemplate the flange of each signal member as having its outer edge or rim coated with radium, phosphorus or other luminous material as indicated at 18 in Figure 6 to exhibit a visible ring in the dark.

It is obvious, of course, that the lens glasses 15 and buttons 17 may have similar or different coloring and that the color or colors thereof may be varied to accord with any existing safety rules governing front and rear signals for vehicles and that I may employ any suitable or fanciful arrangement of the buttons, bearing in mind always the primary consideration involved in their use to attract and hold the attention of those in traffic to whose attention the signal must be plainly displayed.

It is also obvious the connecting band 12 affords means by which the device as a whole may be conveniently suspended from any suitable projecting member or portion of the instrument panel or other suitable portion of an automobile in disuse, whereby it may be readily reached in times of use, it being apparent that the signaling device of my invention may remain on the wrist or forearm of the user without inconvenience in driving and without glare except when the arm is extended beyond one side of the car and the device rendered visible by reason of reflection of the headlight of other cars proceeding in the same or a different direction.

It is obvious other changes in arrangement, coloring and the like may be resorted to throughout a wide range without varying the essentials above outlined, and that the device not only accommodates itself to ready application and removal, but the signal members are weatherproof; there is nothing to tear or injure the garments or flesh in applying and removing the device, and its use does not interfere with proper manipulation of the vehicle controls.

What is claimed is:

A traffic signal device comprising a pair of spaced apart opposed members having convex surfaces facing inwardly toward one another, reflective signal elements carried by the said members at their outwardly facing surfaces, and a substantially U-shaped spring supporting band the extremities of which extend between the said members and the reflective elements, said extremities of the band being rigidly secured flatwise to said members and terminating within the marginal limits thereof and being of a width less than that of the said members whereby the latter project laterally beyond the sides of said band extremities and longitudinally therebeyond and thus form engaging terminals for the device.

WILLIAM H. SCOTT.